(12) United States Patent
Freeman et al.

(10) Patent No.: US 11,021,974 B2
(45) Date of Patent: Jun. 1, 2021

(54) TURBINE WHEEL ASSEMBLY WITH RETAINER RINGS FOR CERAMIC MATRIX COMPOSITE MATERIAL BLADES

(71) Applicants: Rolls-Royce North American Technologies Inc., Indianapolis, IN (US); Rolls-Royce Corporation, Indianapolis, IN (US)

(72) Inventors: Ted J. Freeman, Danville, IN (US); Aaron D. Sippel, Zionsville, IN (US); James Sellhorn, Indianapolis, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 367 days.

(21) Appl. No.: 16/156,546

(22) Filed: Oct. 10, 2018

(65) Prior Publication Data
US 2020/0116034 A1  Apr. 16, 2020

(51) Int. Cl.
*F01D 5/30* (2006.01)

(52) U.S. Cl.
CPC ........ *F01D 5/3015* (2013.01); *F05D 2230/60* (2013.01); *F05D 2240/80* (2013.01); *F05D 2260/30* (2013.01)

(58) Field of Classification Search
CPC ............... F01D 5/3015; F05D 2230/60; F05D 2240/80; F05D 2260/30
See application file for complete search history.

(56) References Cited

U.S. PATENT DOCUMENTS

| | | | |
|---|---|---|---|
| 3,572,966 A * | 3/1971 | Borden | F01D 5/081 416/95 |
| 4,344,740 A * | 8/1982 | Trenschel | F01D 5/3015 416/193 A |
| 5,320,492 A * | 6/1994 | Bouru | F01D 5/3015 416/220 R |
| 6,106,234 A | 8/2000 | Gabbitas | |
| 6,190,131 B1 | 2/2001 | Deallenbach | |
| 6,494,684 B1 | 12/2002 | Wagner | |
| 7,040,866 B2 | 5/2006 | Gagner | |
| 7,229,252 B2 | 6/2007 | Hermiston et al. | |
| 8,206,119 B2 | 6/2012 | Liotta et al. | |
| 8,313,289 B2 | 11/2012 | Caprario et al. | |
| 9,212,562 B2 | 12/2015 | Burt et al. | |
| 9,303,521 B2 | 4/2016 | Arnold | |
| 9,567,857 B2 | 2/2017 | Snyder | |
| 9,605,553 B2 | 3/2017 | Hafner | |
| 9,624,784 B2 | 4/2017 | Hafner | |
| 9,677,407 B2 | 6/2017 | Borja et al. | |
| 10,024,183 B2 | 7/2018 | Partyka et al. | |
| 10,060,276 B2 * | 8/2018 | Tanaka | F01D 11/003 |

(Continued)

*Primary Examiner* — Nathaniel E Wiehe
*Assistant Examiner* — Eric A Lange
(74) *Attorney, Agent, or Firm* — Barnes & Thornburg LLP

(57) ABSTRACT

A wheel assembly for a gas turbine engine includes a disk, an annular coverplate, and an anti-rotation feature. The disk is adapted to receive blades and rotate about an axis during use of the gas turbine engine. The annular coverplate is coupled with the disk and adapted to block axial movement of the blades. The anti-rotation feature is coupled with the disk and the annular coverplate to resist rotation of the annular coverplate relative to the disk.

9 Claims, 6 Drawing Sheets

(56) References Cited

U.S. PATENT DOCUMENTS

| | | | |
|---|---|---|---|
| 2008/0008593 A1* | 1/2008 | Zagar | F01D 5/3015 |
| | | | 416/220 R |
| 2009/0148295 A1 | 6/2009 | Caprario et al. | |
| 2011/0027092 A1* | 2/2011 | Engle | F01D 5/3015 |
| | | | 416/220 R |
| 2016/0040542 A1 | 2/2016 | Weise | |
| 2017/0328226 A1* | 11/2017 | Kang | F01D 5/326 |

\* cited by examiner

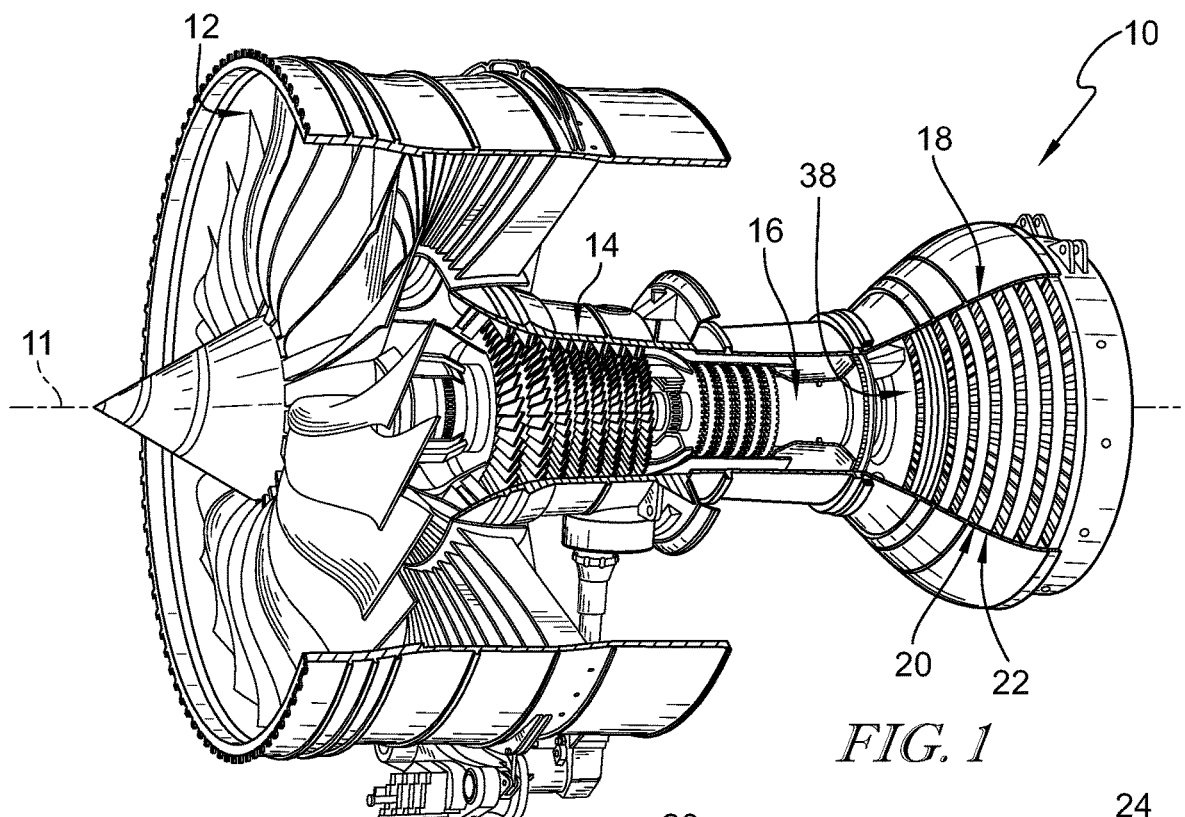
FIG. 1
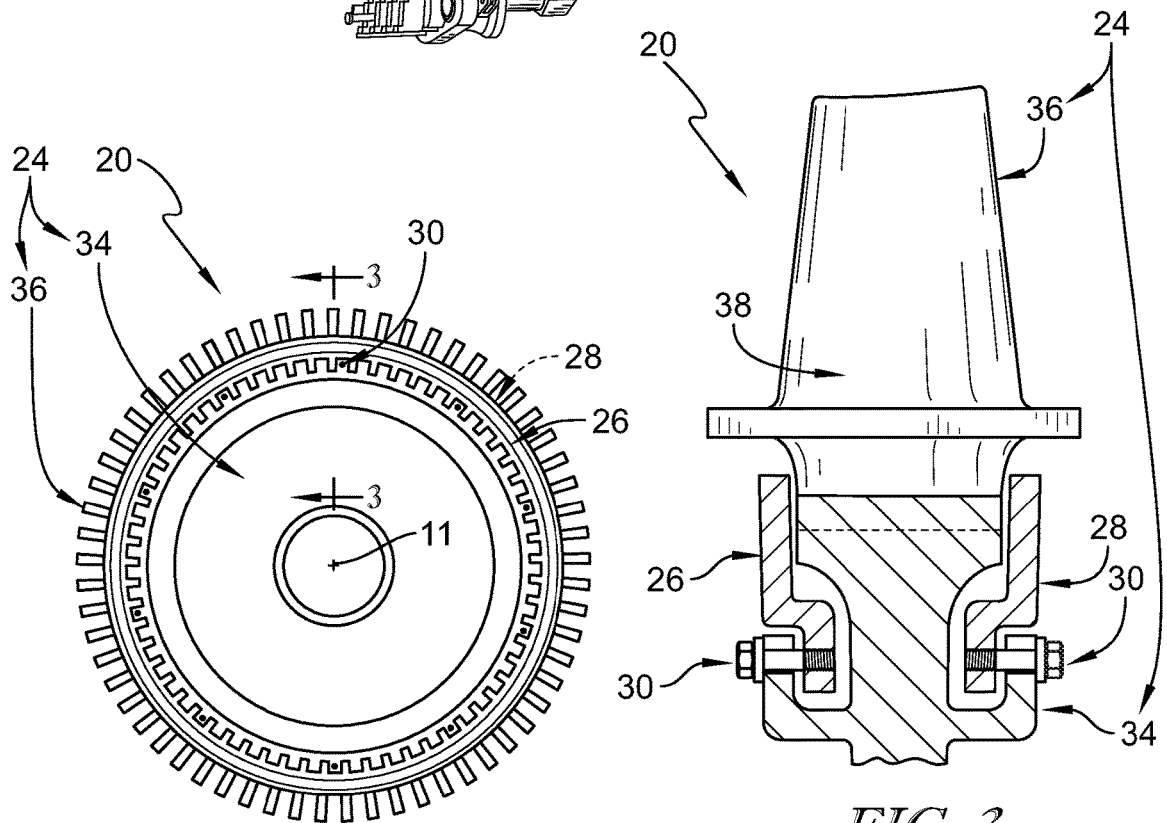
FIG. 2
FIG. 3

TURBINE WHEEL ASSEMBLY WITH RETAINER RINGS FOR CERAMIC MATRIX COMPOSITE MATERIAL BLADES

FIELD OF THE DISCLOSURE

The present disclosure relates generally to gas turbine engines, and more specifically to wheel assemblies for use in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

The turbine may include turbine wheels having blades adapted to interact with the hot combustion products. In some turbine wheels, the blades may be coupled to a disk that supports the blades in a gas path of the engine. The blades may be retained axially by coverplates positioned adjacent the disk.

SUMMARY

The present disclosure may comprise one or more of the following features and combinations thereof.

A wheel assembly for a gas turbine engine may include a disk, an annular coverplate, and an anti-rotation feature. The disk may be adapted to rotate about an axis during use of the gas turbine engine. The disk may include a body formed to define a plurality of blade-receiver slots that extend axially through the body and a castellated band coupled with the body to define a circumferentially extending disk channel between the body and the castellated band. The annular coverplate may be coupled with the disk to at least partially block axial access into the plurality of blade-receiver slots. The annular coverplate may include a retainer wall and a castellated ring that extends away from the retainer wall. The castellated ring may be located in the disk channel to cause the castellated ring to be interlocked with the castellated band of the disk. The anti-rotation feature may be configured to limit rotation of the annular coverplate about the axis relative to the disk. The anti-rotation feature may extend axially through the castellated band and into the disk channel such that a portion of the anti-rotation feature is aligned axially with and configured to engage circumferentially a portion of the castellated ring.

In some embodiments, the castellated ring of the coverplate may include a coverplate rail that extends axially away from the retainer wall and a plurality of coverplate tabs that extend radially away from the coverplate rail. Each of the plurality of coverplate tabs may be spaced apart from one another circumferentially around the axis. The castellated band may include a disk rail that extends axially away from the body and a plurality of disk tabs that extend radially away from the disk rail. Each of the plurality of disk tabs may be spaced apart from one another circumferentially around the axis.

In some embodiments, the anti-rotation feature may include a pin. The pin may extend axially through one of the plurality of disk tabs and into the disk channel.

In some embodiments, the pin may extend axially through one of the plurality of coverplate tabs. In some embodiments, the pin may be located circumferentially between a pair of the plurality of coverplate tabs.

In some embodiments, the anti-rotation feature may include a key block located between the pair of the plurality of coverplate tabs. The pin may be located in the key block.

In some embodiments, the anti-rotation feature may include a retainer ring received in the annular coverplate. The retainer ring may be spaced apart axially from the plurality of coverplate tabs to locate the plurality of disk tabs therebetween.

In some embodiments, the anti-rotation feature may include a pin. The pin may extend axially through the castellated band and into the disk channel.

According to another aspect of the present disclosure, a wheel assembly for a gas turbine engine includes a disk, an annular coverplate, and an anti-rotation feature. The disk may include a body and a castellated band coupled with the body to define a circumferentially extending disk channel between the body and the castellated band. The annular coverplate may include a retainer wall and a castellated ring coupled with the retainer wall and located in the disk channel. The anti-rotation feature may extend axially through the castellated band of the disk and into the disk channel.

In some embodiments, the anti-rotation feature may include a pin. The pin may extend axially through the castellated band and into the disk channel.

In some embodiments, the castellated band may include a disk rail that extends axially away from the body of the disk and a plurality of disk tabs that extend radially outward away from the disk rail. Each of the plurality of disk tabs may be spaced apart from one another circumferentially around the axis. At least one of the plurality of disk tabs may be formed to define a pin-receiving passage that extends axially through the at least one of the plurality of disk tabs. The anti-rotation feature may include a pin that extends axially through the pin-receiving passage.

In some embodiments, the at least one of the plurality of disk tabs may be formed to include a notch. The notch may extend radially inward into the at least one of the plurality of disk tabs to form the pin-receiving passage.

In some embodiments, the castellated ring of the coverplate may include a coverplate rail that extends axially away from the retainer wall and a plurality of coverplate tabs that extend radially away from the coverplate rail. The pin may extend axially into a passage formed in one of the plurality of coverplate tabs. In some embodiments, the passage may be threaded.

In some embodiments, the castellated ring may include a coverplate rail that extends axially away from the retainer wall and a plurality of coverplate tabs that extend radially inward away from the coverplate rail. The anti-rotation feature may include a key block located circumferentially between a neighboring pair of coverplate tabs included in the plurality of coverplate tabs and a pin that extends axially through the castellated band and into the key block.

In some embodiments, the castellated ring of the coverplate may include a coverplate rail that extends axially away from the retainer wall and a plurality of coverplate tabs that extend radially inward away from the coverplate rail. The anti-rotation feature may include a retainer ring received in the retainer wall and spaced apart axially from the plurality of coverplate tabs to locate the castellated band between the retainer ring and the plurality of coverplate tabs.

In some embodiments, the anti-rotation feature may include a key block and a pin. The key block may be located circumferentially between tabs included in the castellated ring of the coverplate. The pin may extend axially through the castellated band and into the key block.

According to an aspect of the present disclosure, a method may include a number of steps. The method may include providing a wheel assembly that includes a disk, a plurality of blades, and an annular coverplate, inserting the plurality of blades in the disk so that the plurality of blades are arranged circumferentially around an axis of rotation of the disk, aligning the annular coverplate axially along the axis, moving the annular coverplate axially relative to the disk to receive a portion of the annular coverplate in channel defined by the disk, rotating the annular coverplate relative to the disk to interlock the annular coverplate with the disk to cause the annular coverplate to block axial movement of the plurality of blades relative to the disk, and inserting an anti-rotation pin axially through the disk into an opening formed in the annular coverplate.

In some embodiments, the method may include locating a key block in the opening formed in the annular coverplate and inserting the anti-rotation pin axially into the key block. In some embodiments, the method may include inserting a retainer ring in the annular coverplate to block axial movement of the anti-rotation pin away from the disk.

These and other features of the present disclosure will become more apparent from the following description of the illustrative embodiments.

BRIEF DESCRIPTION OF THE DRAWINGS

FIG. 1 is a cutaway view of a gas turbine engine that includes a fan, a compressor, a combustor, and a turbine and the turbine includes a plurality of turbine wheel assemblies in accordance with the present disclosure adapted to extract work from hot combustion products received from the combustor;

FIG. 2 is a front elevation view of one of the turbine wheel assemblies included in the gas turbine engine of FIG. 1 showing that the turbine wheel assembly includes a disk, a plurality of turbine blades coupled with the disk, a coverplate arranged to block axial movement of the blades, and an anti-rotation feature configured to block movement of the coverplate relative to the disk;

FIG. 3 is a diagrammatic and cross-sectional view of the turbine wheel assembly of FIG. 2 taken along line 3-3 showing a forward coverplate and an aft coverplate coupled with the disk to block axial movement of the blades and further showing anti-rotation features that extend axially through the disk and the coverplates to block rotation of the coverplates relative to the disk;

DETAILED DESCRIPTION OF THE DRAWINGS

Figure 4:
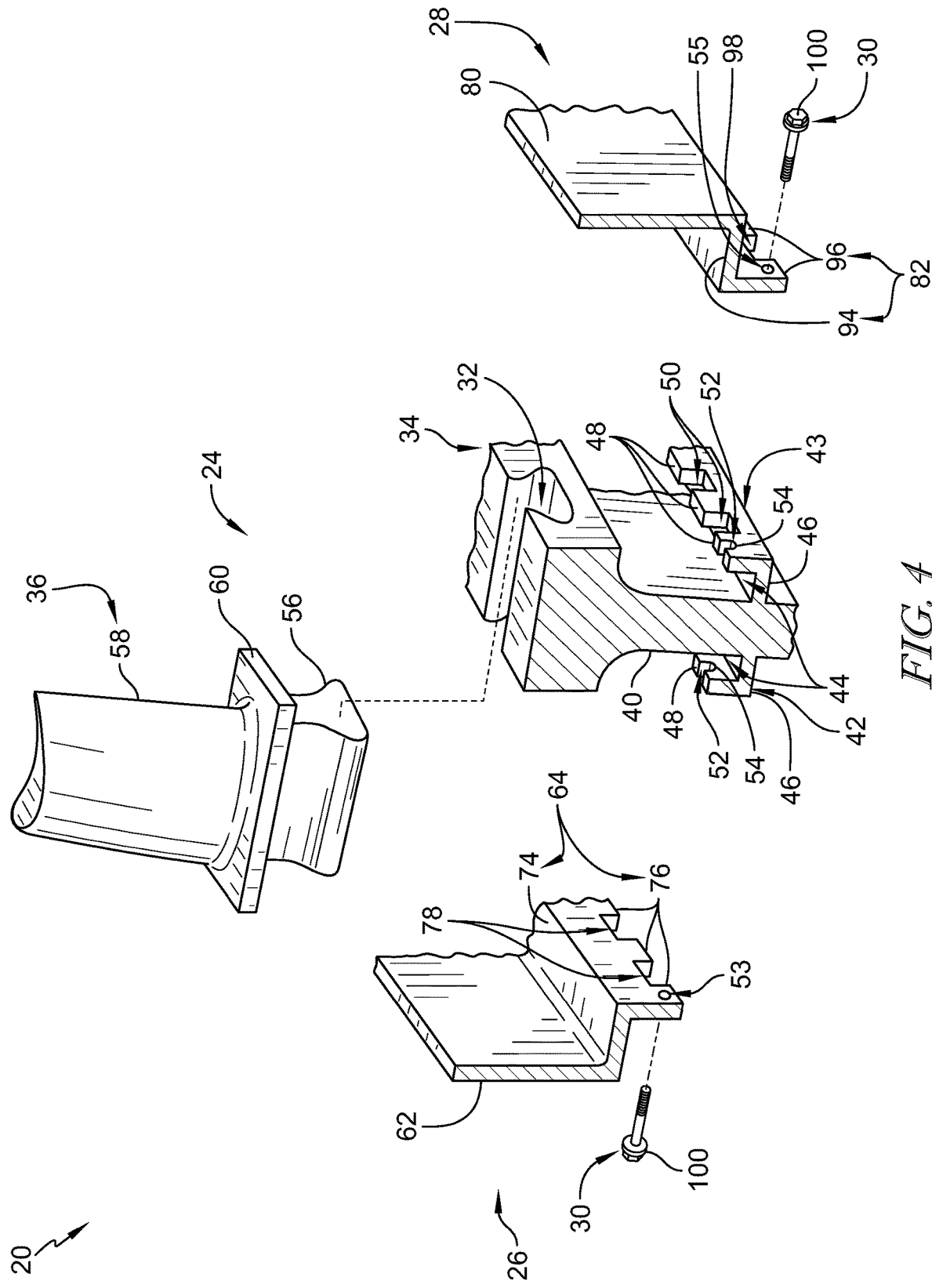
FIG. 4 is an exploded view of a portion of the turbine wheel assembly of FIG. 2 suggesting that the blades are configured to be located in blade-receiver slots formed in the disk and the forward and aft coverplates are castellated and configured to interlock with the disk to block axial movement of the blades and further suggesting that the anti-rotation features extend axially through the disk tab and into the coverplates.

For the purposes of promoting an understanding of the principles of the disclosure, reference will now be made to a number of illustrative embodiments illustrated in the drawings and specific language will be used to describe the same.

A turbine wheel assembly 20 according to the present disclosure is adapted for use in a gas turbine engine 10 as suggested in FIGS. 1 and 2. The gas turbine engine 10 includes a fan 12, a compressor 14, a combustor 16, and a turbine 18. The fan 12 generates thrust for propelling an aircraft. The compressor 14 compresses and delivers air to the combustor 16. The combustor 16 mixes fuel with the compressed air received from the compressor 14 and ignites the fuel. The hot, high-pressure gases from the burning fuel are directed into the turbine 18 where the turbine 18 extracts work from the gases to drive the compressor 14 and the fan 12. In other embodiments, the gas turbine engine 10 may include a shaft, turboprop, or gearbox in place of the fan 12.

The turbine 18 includes a plurality of turbine wheel assemblies 20 and turbine vane assemblies 22 as shown in FIG. 1. Each turbine wheel assembly 20 is configured to interact with the hot combustion gases from the combustor 16 and rotate about an axis 11 of the gas turbine engine 10 to generate power for driving the compressor 14 and/or the fan 12. The turbine vane assembly 22 is located between the turbine wheel assemblies 20 to direct gases received from an upstream turbine wheel assembly 20 toward a downstream turbine wheel assembly 20.

One of the turbine wheel assemblies 20 is shown in FIG. 2. The turbine wheel assembly 20 includes a disk assembly 24, a forward annular coverplate 26, an aft annular coverplate 28, and anti-rotation features 30 as shown in FIGS. 2 and 3. The disk assembly 24 is coupled to a shaft of the gas turbine engine 10 and rotates the shaft about the axis 11 during operation of the gas turbine engine 10 to generate power. The forward and aft coverplates 26, 28 are coupled with the disk assembly 24 to at least partially block axial access into a plurality of blade-receiver slots 32 formed in the disk assembly 24. The anti-rotation features 30 limit rotation of the annular coverplates 26, 28 about the axis 11 relative to the disk assembly 24.

The disk assembly 24 includes a disk 34 and a plurality of turbine blades 36 as shown in FIGS. 2 and 3. The disk 34 retains the blades 36 and is adapted to rotate about the axis 11 during use of the gas turbine engine 10. The plurality of blades 36 are adapted to interact with and be rotated by the gases that move axially along a gas flow path 38 of the gas turbine engine 10.

Figure 5:
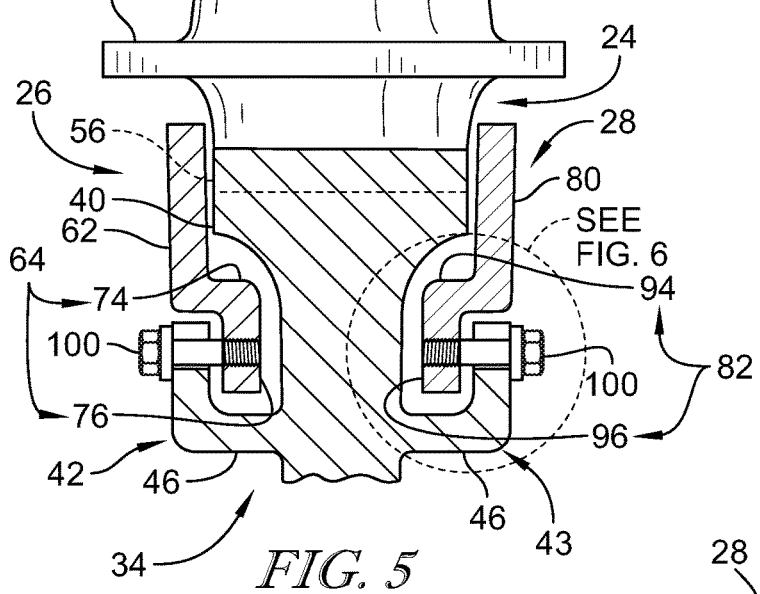
FIG. 5 is a view similar to FIG. 3 showing the disk, one of the blades located in a blade-receiver slot formed in the disk, the forward annular coverplate interlocked with a fore side of the disk, the aft annular coverplate interlocked with an aft side of the disk, and forward and aft anti-rotation features that extend through the coverplates and the disk.
Figure 7:
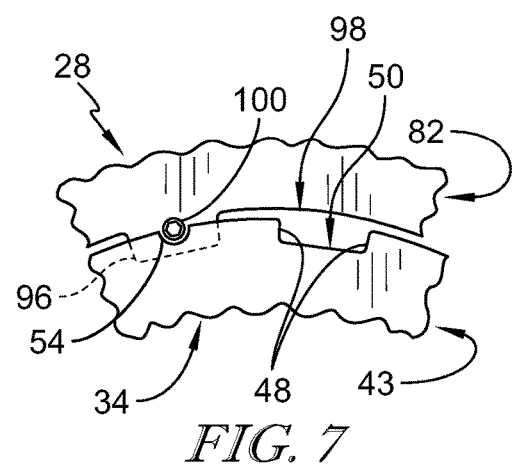
FIG. 7 is a detail elevation view of the engagement between a coverplate tab included in the coverplate and a disk tab included in the disk to block axial movement of the coverplate away from the disk and suggesting that the anti-rotation feature blocks rotation of the coverplate about an axis relative to the disk.

The disk 34 includes a body 40 which defines the plurality of blade-receiver slots 32, a forward castellated band 42, and an aft castellated band 43 as shown in FIGS. 4 and 5. The body 40 is formed to define the plurality of blade-receiver slots 32 that extend axially through the body 40. The aft castellated band 43 is coupled with the aft side of the body 40 to define a circumferentially extending disk channel 44 between the body 40 and the castellated band 43. The fore castellated band 42 is coupled with the fore side of the body 40 and is substantially similar to the aft castellated band 43.

Figure 6:
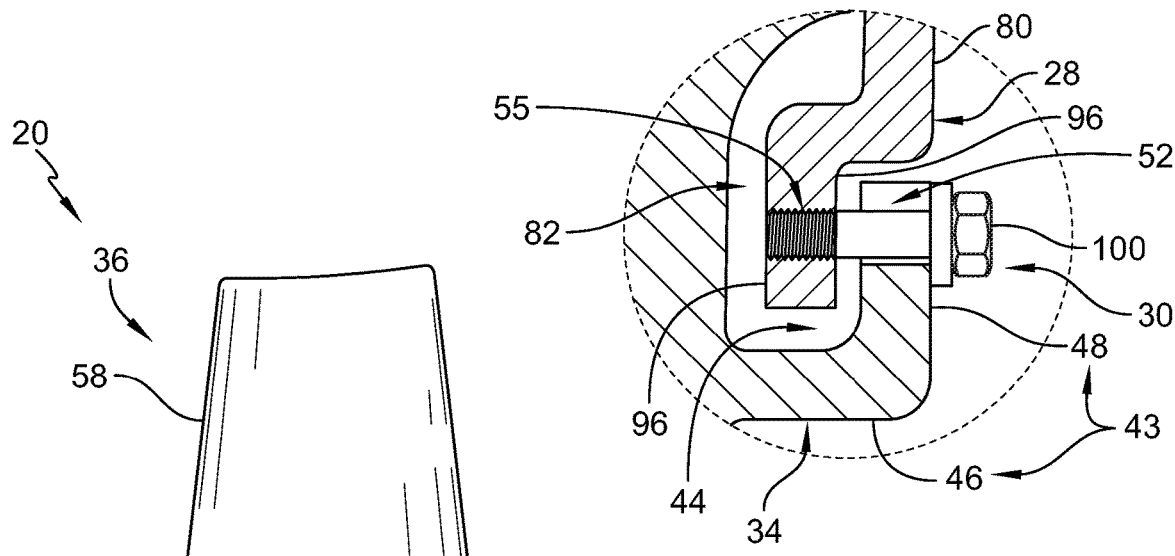
FIG. 6 is a detail view of FIG. 5 showing the interlocking engagement between a tab included in the aft coverplate and a tab included in the disk and showing that the anti-rotation feature includes a pin that extends axially through the tab of the disk into a circumferentially extending channel and into the tab of the aft coverplate.

The aft castellated band 43 includes a disk rail 46 and a plurality of disk tabs 48 as shown in FIGS. 4-6. The disk rail 46 extends axially away from the body 40. The plurality of disk tabs 48 extend radially away from the disk rail 46. Each of the plurality of disk tabs 48 are spaced apart from one another circumferentially around the axis 11 to form openings 50 between the disk tabs 48. In the illustrative embodiment, the disk tabs 48 extend radially outwardly away from the disk rail 46 to form the disk channel 44. In other embodiments, the disk tabs 48 may extend radially inwardly away from the disk rail 46 to from the disk channel 44.

In the illustrative embodiment, at least one of the plurality of disk tabs 48 is formed to define a pin-receiving passage 52 as shown in FIG. 4. The pin-receiving passage 52 extends axially through at least one of the plurality of disk tabs 48. Illustratively, the pin-receiving passage 52 is defined by a notch 54 that extends radially inward into the disk tab 48 as shown in FIG. 4.

Each of the plurality of blades 36 includes a root 56, an airfoil 58, and a platform 60 as shown in FIGS. 4 and 5. The root 56 of each blade 36 is located in one of the blade-receiver slots 32 formed in the body 40 of the disk 34. In the illustrative embodiment, the root 56 is dovetail shaped when view axially. The airfoil 58 extends radially away from the root 56 relative to the axis 11. The airfoils 58 are shaped to be pushed circumferentially by the hot gases moving in the gas flow path 38 to cause the turbine wheel assembly 20 to rotate about the axis 11 during operation of the gas turbine engine 10. The platform 60 extends circumferentially from the airfoil 58 to define a portion of a boundary of the gas path and block hot gasses interacting with a radially outer portion of the airfoil 58 from moving radially-inward toward the disk 34.

The platform 60 is formed integrally with the airfoil 58 in the illustrative embodiment. In some embodiments, the platform 60 may be an offloaded platform. In other embodiments, the forward annular coverplate 26 may be shaped to include a forward platform wing and the aft annular coverplate 28 may be shaped to include an aft platform wing.

The forward annular coverplate 26 includes a forward retainer wall 62 and a forward castellated ring 64 as shown in FIGS. 4-6. The retainer wall 62 extends radially outward away from the axis 11 and is configured to at least partially block axial access to the blade-receiver slots 32 to block axial movement of the blades 36. The forward castellated ring 64 extends away from the retainer wall 62. The castellated ring 64 is located in the disk channel 44 to cause the castellated ring 64 to be interlocked with the castellated band 42 of the disk 34 to couple the forward annular coverplate 26 with the disk 34.

The castellated ring 64 of the forward annular coverplate 26 includes a coverplate rail 74 and a plurality of coverplate tabs 76 as shown in FIGS. 4-6. The coverplate rail 74 extends axially away from the retainer wall 62. The coverplate tabs 76 extend radially inward away from the coverplate rail 74. Each of the plurality of coverplate tabs 76 is spaced apart from a neighboring coverplate tab 76 circumferentially around the axis 11 to form openings 78 between the coverplate tabs 76. The openings 78 are sized to allow at least one of the disk tabs 48 to pass through the openings 78 when the coverplate 26 is aligned axially with the axis 11 and moved axially relative to the disk 34 locating the castellated ring 64 in the disk channel 44. One or more of the coverplate tabs 76 is formed to define passages 53 sized to receive the one of the anti-rotation features 30 as shown in FIG. 4. The passages 53 are threaded in the illustrative embodiment. In other embodiments, the anti-rotation features 30 may extend into the openings 78.

In the illustrative embodiment, the coverplate rail 74 extends axially aft away from the retainer wall 62 and the coverplate tabs 76 extend radially inward away from the coverplate rail 74. In other embodiments, the coverplate tabs 76 may extend radially outward back toward the coverplate rail 74 to form a forward tab channel therebetween. The disk tabs 48 may be located in the forward tab channel to cause the castellated ring 64 to be interlocked with the castellated band 42 of the disk 34.

The aft annular coverplate 28 includes an aft retainer wall 80 and an aft castellated ring 82 as shown in FIGS. 4-6. The retainer wall 80 extends radially outward away from the axis 11 and is configured to at least partially block axial access to the blade-receiver slots 32. The aft castellated ring 82 extends away from the retainer wall 80. The castellated ring 82 is located in the disk channel 44 to cause the castellated ring 82 to be interlocked with the castellated band 42 of the disk 34.

The castellated ring 82 of the aft annular coverplate 28 includes a coverplate rail 94 and a plurality of coverplate tabs 96 as shown in FIGS. 4-6. The coverplate rail 94 extends axially away from the retainer wall 80. The coverplate tabs 96 extend radially away from the coverplate rail 94. Each of the plurality of coverplate tabs 96 is spaced apart from a neighboring coverplate tab 96 circumferentially around the axis 11 to form openings 98 between the coverplate tabs 96. The openings 98 are sized to allow at least one of the disk tabs 48 to pass through the openings 98 when the coverplate 28 is aligned axially with the axis 11 and moved axially relative to the disk 34 locating the castellated ring 82 in the disk channel 44. One or more of the coverplate tabs 96 is formed to define passages 55 sized to receive the anti-rotation feature 30. The passages 55 are threaded in the illustrative embodiment.

In the illustrative embodiment, the coverplate rail 94 extends axially aft away from the retainer wall 80 and the coverplate tabs 96 extend radially inward away from the coverplate rail 94. In other embodiments, the coverplate tabs 96 may extend radially outward back toward the coverplate rail 94 to form an aft tab channel therebetween. The disk tabs 48 may be located in the aft tab channel to cause the castellated ring 82 to be interlocked with the castellated band 42 of the disk 34.

In the illustrative embodiment, the openings 50 formed in the castellated band 42 between the disk tabs 48 are sized to allow at least one of the coverplate tabs 76, 96 to pass through the opening 50. In other embodiments, the openings 50 may be sized to allow more than one coverplate tab 76, 96 to pass through the opening 50.

The anti-rotation features 30 each include a pin 100 as shown in FIGS. 2-6. Each pin 100 extends axially through one of the plurality of disk tabs 48 and into the disk channel 44. In the illustrative embodiment, the pins 100 extends axially through the notches 54 that define the pin-receiving passages 52 in the disk tabs 48, into the disk channel 44, and axially into one of the passages 53, 55 in the plurality of coverplate tabs 76, 96.

A method of assembling the turbine wheel assembly 20 may include a number of steps. The method includes providing the wheel assembly 20 that includes the disk 34, the plurality of blades 36, the annular coverplates 26, 28, and the anti-rotation feature 30. The method includes inserting the plurality of blades 36 in the disk 34 so that the plurality of blades 36 are arranged circumferentially around the axis 11 of rotation of the disk 34, The method includes aligning one of the annular coverplates 26, 28 axially along the axis 11 and moving the annular coverplate 26, 28 axially relative to the disk 34 to receive a portion of the annular coverplate 26, 28 in the channel 44 defined by the disk 34. The method includes rotating the annular coverplate 26, 28 relative to the disk 34 to interlock the annular coverplate 26, 28 with the disk 34 to cause the annular coverplate 26, 28 to block axial movement of the plurality of blades 36 relative to the disk 34. The method also includes inserting an anti-rotation pin 100 axially through the disk 34 into an opening 50, 52 formed in the annular coverplate 26, 28.

Another embodiment of a turbine wheel assembly 220 in accordance with the present disclosure is shown in FIGS. 8-11. The turbine wheel assembly 220 is substantially similar to the turbine wheel assembly 20 shown in FIGS. 1-7 and described herein. Accordingly, similar reference numbers in the 200 series indicate features that are common between the turbine wheel assembly 20 and the turbine wheel assembly 220. The description of the turbine wheel assembly 20 is incorporated by reference to apply to the turbine wheel assembly 220, except in instances when it conflicts with the specific description and the drawings of the turbine wheel assembly 220.

Figure 8:
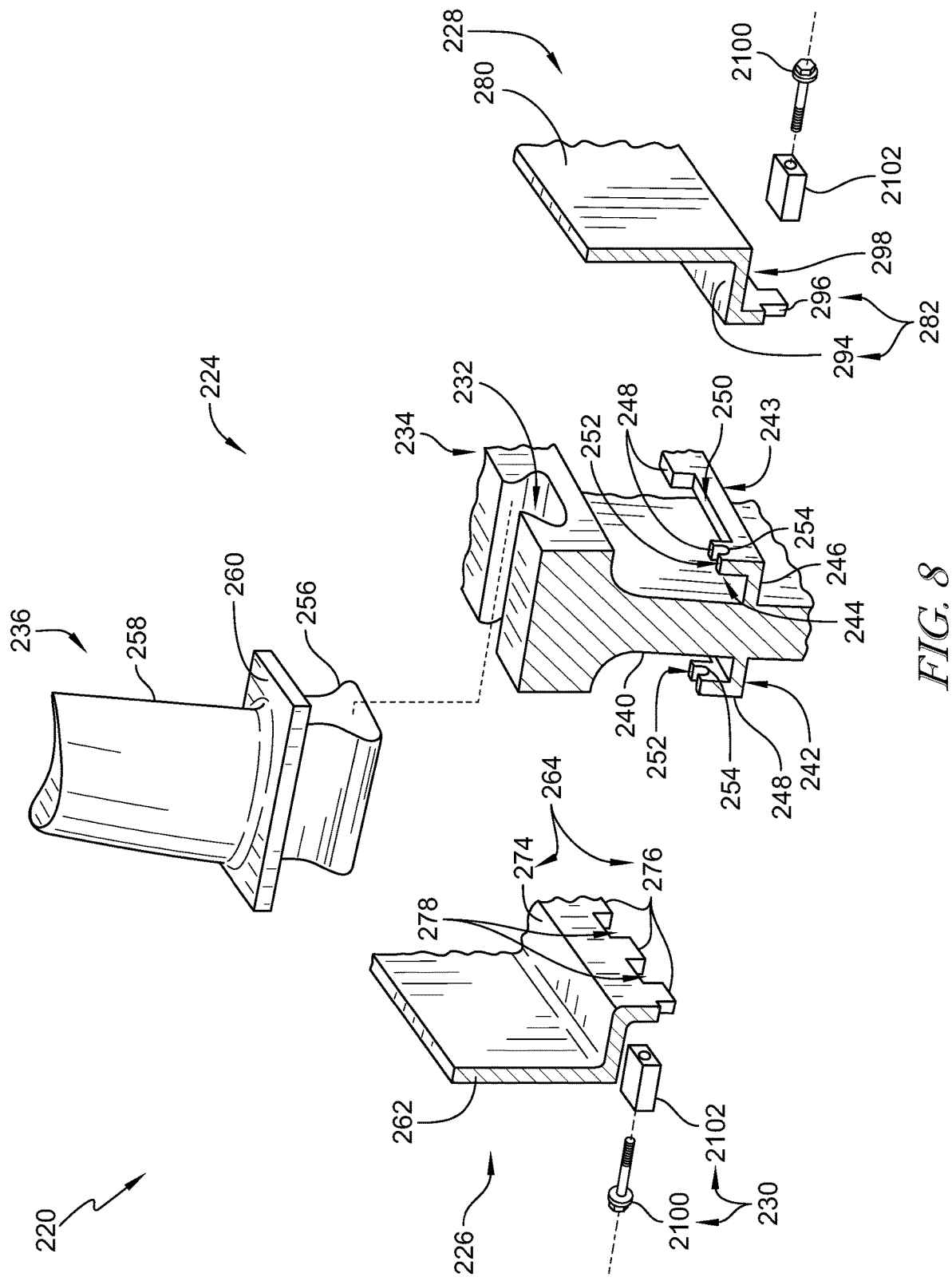
FIG. 8 is an exploded view of a portion of another embodiment of a turbine wheel assembly adapted for used in the gas turbine engine of FIG. 1 showing a blade configured to be located in a blade-receiver slot formed in a disk, forward and aft coverplates adapted to interlock with the disk, and anti-rotation features that each include a key block adapted to be located between a pair of coverplate tabs included in the annular coverplates and a pin that extends axially through one of a plurality of disk tabs included in the disk and into the key block.
Figure 9:
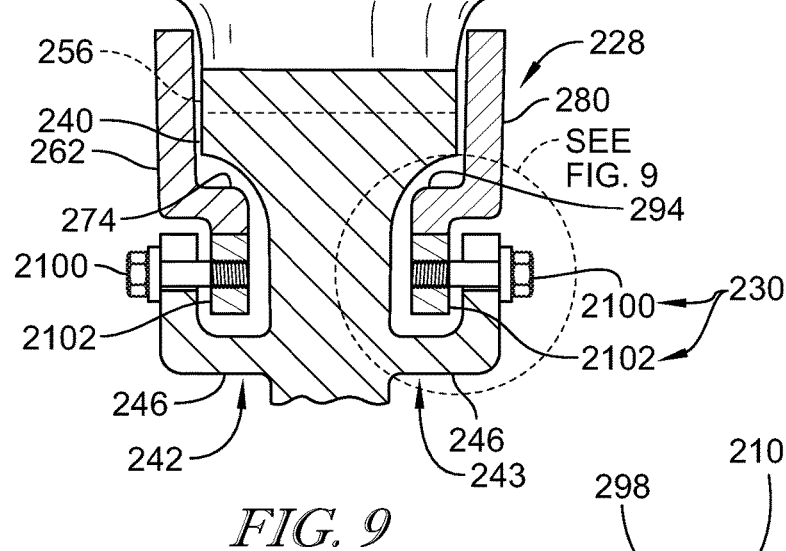
FIG. 9 is a diagrammatic and cross-sectional view of the turbine wheel assembly of FIG. 8 showing the forward and aft coverplates interlocked with the disk and that the each anti-rotation feature includes a pin that extends axially through a castellated band of the disk and into the key block.
Figure 11:
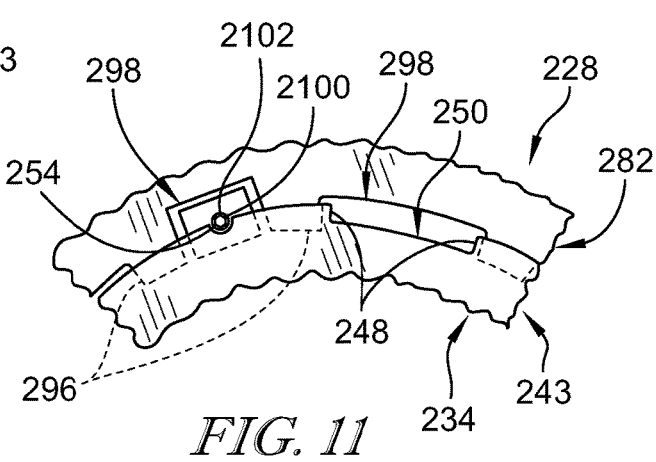
FIG. 11 is a detail elevation view of the aft coverplate interlocked with the disk showing the key block located between neighboring coverplate tabs and the pin that extends through the disk and into the key block to block rotation of the aft coverplate relative to the disk.

The turbine wheel assembly 220 includes a disk assembly 224, a forward annular coverplate 226, an aft annular coverplate 228, and an anti-rotation feature 230 as shown in FIGS. 8 and 9. The disk assembly 224 is coupled to a shaft of the gas turbine engine 10 and rotates the shaft about the axis 11 during operation of the gas turbine engine 10 to generate power. The forward and aft coverplates 226, 228 are coupled with the disk assembly 224 to at least partially block axial access into a plurality of blade-receiver slots 232 formed in the disk assembly 224. The anti-rotation features 230 are configured to limit rotation of the annular coverplates 226, 228 about the axis 11 relative to the disk assembly 224.

The disk assembly 224 includes a disk 234 and a plurality of turbine blades 236 as shown in FIG. 8. The disk 234 includes a body 240 which defines a plurality of blade-receiver slots 232, a castellated band 242, and a castellated band 243 as shown in FIGS. 3 and 4. The castellated bands 242, 243 are coupled with the body 240 to define circumferentially extending disk channels 244 between the body 240 and the castellated bands 242, 243. The castellated band 243 is similar to the castellated band 242.

Figure 10:
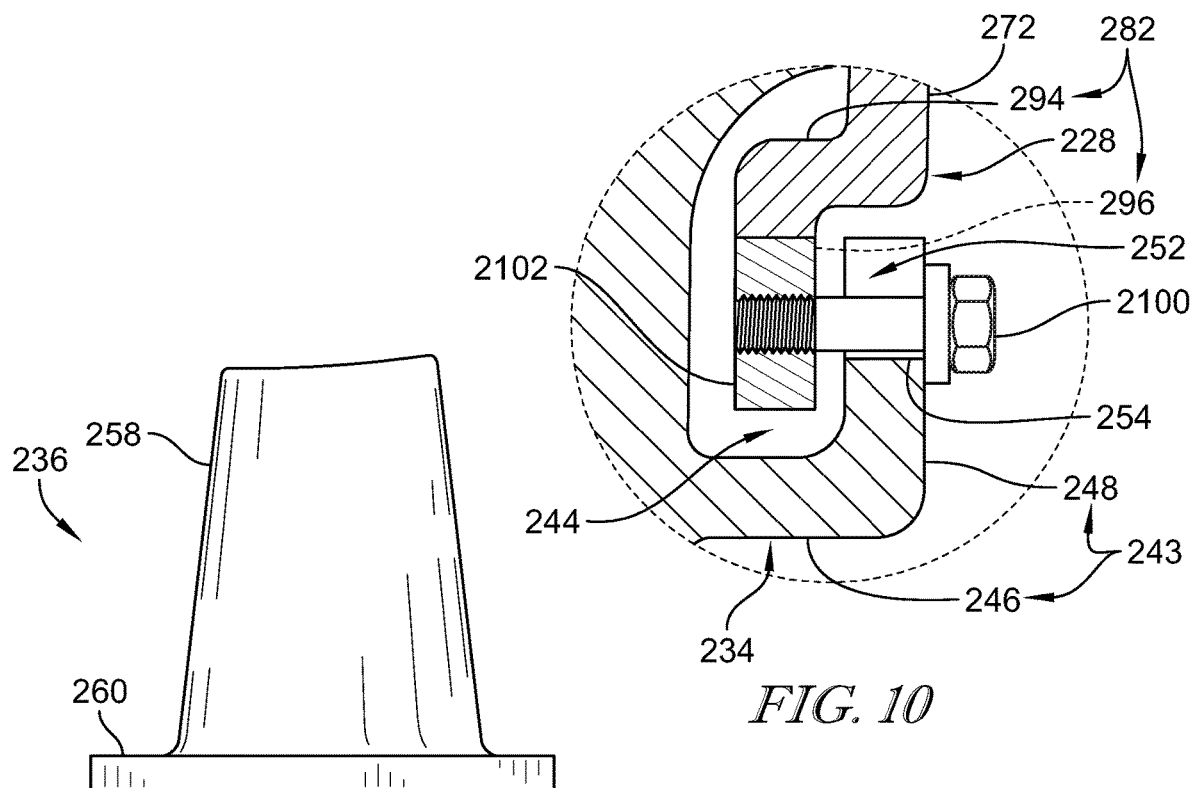
FIG. 10 is a detail view of FIG. 9 showing that the disk includes the disk tabs that define a channel, the aft coverplate is located in the channel to interlock with the disk, and the anti-rotation feature includes the key block located in the channel between coverplate tabs and a pin that extends through one of the disk tabs and into the key block.

The castellated band 242 includes a disk rail 246 and a plurality of disk tabs 248 as shown in FIGS. 8-10. The disk rail 246 extends axially away from the body 240. The plurality of disk tabs 248 extend radially away from the disk rail 246. Each of the plurality of disk tabs 248 are spaced apart from one another circumferentially around the axis 11 to form openings 250 between the disk tabs 248.

In the illustrative embodiment, at least one of the plurality of disk tabs 248 is formed to define a pin-receiving passage 252 as shown in FIG. 8. The pin-receiving passage 252 extends axially through at least one of the plurality of disk tabs 248. Illustratively, some disk tabs 248 are formed to include a notch 254 that extends radially inward into the disk tab 248 to form the pin-receiving passage 252.

Each of the plurality of blades 236 includes a root 256, an airfoil 258, and a platform 260 as shown in FIGS. 8 and 9. In some embodiments, the platform 260 may be an offloaded platform. In other embodiments, the forward annular coverplate 226 may be shaped to include a forward platform wing and the aft annular coverplate 228 may be shaped to include an aft platform wing.

The forward annular coverplate 226 includes a forward retainer wall 262 and a forward castellated ring 264 as shown in FIGS. 8-10. The retainer wall 262 extends radially outward away from the axis 11 and is configured to at least partially block axial access to the blades 236 received in the blade-receiver slots 232. The forward castellated ring 264 extends away from the retainer wall 262. The castellated ring 264 is located in the disk channel 244 to cause the castellated ring 264 to be interlocked with the castellated band 242 of the disk 234.

The castellated ring 264 of the forward annular coverplate 226 includes a coverplate rail 274 and a plurality of coverplate tabs 276 as shown in FIGS. 8-10. The coverplate rail 274 extends axially away from the retainer wall 262. The plurality of coverplate tabs 276 extend radially away from the coverplate rail 274. Each of the plurality of coverplate tabs 276 are spaced apart from one another circumferentially around the axis 11 to form openings 278 between the coverplate tabs 276. The openings 278 are sized to allow at least one of the disk tabs 248 to pass through the openings 278 when the coverplate 226 is aligned axially with the axis 11 and moved axially relative to the disk 234 locating the castellated ring 264 in the disk channel 244.

The aft annular coverplate 228 includes an aft retainer wall 280 and an aft castellated ring 282 as shown in FIGS. 8-10. The retainer wall 280 extends radially outward away from the axis 11 and is configured to at least partially block axial access to the blades 236 received in the blade-receiver slots 232. The aft castellated ring 282 extends away from the retainer wall 280. The castellated ring 282 is located in the disk channel 244 to cause the castellated ring 282 to be interlocked with the castellated band 242 of the disk 234.

The castellated ring 282 of the aft annular coverplate 228 includes a coverplate rail 294 and a plurality of coverplate tabs 296 as shown in FIGS. 8-10. The coverplate rail 294 extends axially away from the retainer wall 280. The plurality of coverplate tabs 296 extend radially away from the coverplate rail 294. Each of the plurality of coverplate tabs 296 are spaced apart from one another circumferentially around the axis 11 form openings 298 between the coverplate tabs 296. The openings 298 are sized to allow at least one of the disk tabs 248 to pass through the openings 298 when the coverplate 228 is aligned axially with the axis 11 and moved axially relative to the disk 234 locating the castellated ring 294 in the disk channel 244.

In some embodiments, the openings 250 formed in the castellated band 242 between the disk tabs 248 may be sized to allow at least one of the coverplate tabs 276, 296 to pass through the opening 250. In the illustrative embodiment, the openings 250 are sized to allow more than one coverplate tab 276, 296 to pass through the opening 250.

The anti-rotation features 230 include pins 2100 and key blocks 2102 as shown in FIGS. 8-11. Each pin 2100 is located circumferentially between a pair of the plurality of coverplate tabs 276, 296. Each key block 2102 is located between the pair of the plurality of coverplate tabs 276, 296 in the opening 298. The pin 2100 extends axially through one of the plurality of disk tabs 248, into the disk channel 244, and at least a portion of the pin 2100 is located in the key block 2102. In the illustrative embodiment, the pin 2100 extends axially through the notch 254 forming the pin-receiving passage 252 in one of the disk tabs 248 into the disk channel 244 and is located in the key block 2102.

In the illustrative embodiment, the pins 2100 are threaded at an end and the key blocks 2102 are formed with threaded holes. In other embodiments, the pins 2100 are not threaded. Illustratively, the pins 210 are bolts.

A method of assembling the turbine wheel assembly 220 may include a number of steps. The method includes providing the wheel assembly 220 that includes the disk 234, the plurality of blades 236, at least one of the annular coverplates 226, 228, and the anti-rotation feature 230. The method includes inserting the plurality of blades 236 in the disk 234 so that the plurality of blades 236 are arranged circumferentially around the axis 11 of rotation of the disk 234, The method includes aligning the annular coverplate 226, 228 axially along the axis 11 and moving the annular coverplate 226, 228 axially relative to the disk 234 to receive a portion of the annular coverplate 26, 28 in channel 244 defined by the disk 234. The method further includes locating the key block 2102 in an opening 298 formed in the annular coverplate 226, 228. The method includes rotating the annular coverplate 226, 228 relative to the disk 234 to interlock the annular coverplate 226, 28 with the disk 234 to cause the annular coverplate 226, 228 to block axial movement of the plurality of blades 236 relative to the disk 234. The method also includes inserting an anti-rotation pin 2100 axially through the disk 234 into an opening 254 formed in the annular coverplate 26, 28. The method further includes inserting the anti-rotation pin 2100 axially into the key block 2102.

Figure 12:
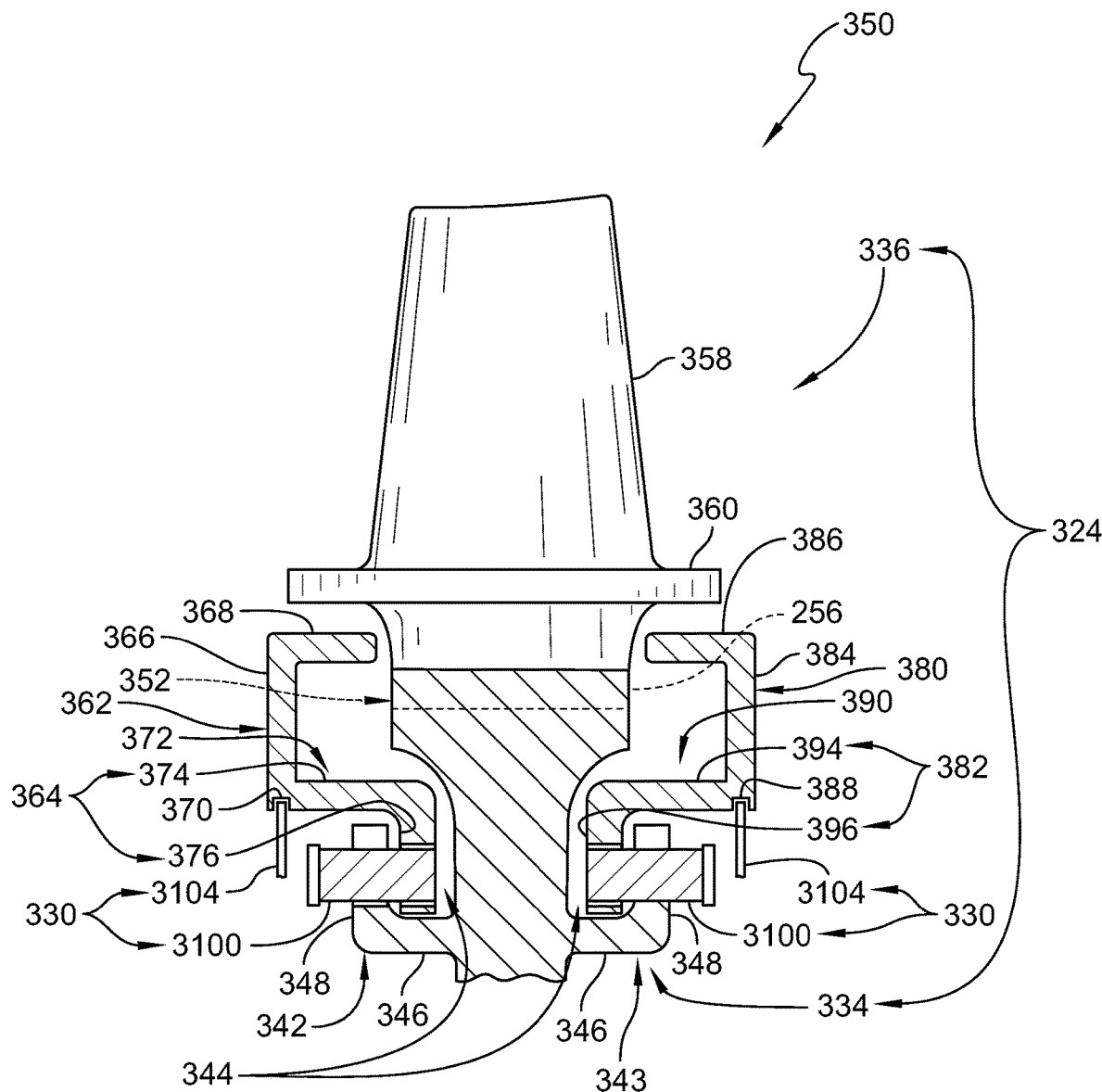
FIG. 12 is a diagrammatic and cross-sectional view of a portion of another embodiment of a turbine wheel assembly adapted for used in the gas turbine engine of FIG. 1 showing the anti-rotation feature includes pins that extend axially through the disk and into the coverplates and retainer rings that are received in the coverplates to block removal of the pin.

Another embodiment of a turbine wheel assembly 320 in accordance with the present disclosure is shown in FIG. 12. The turbine wheel assembly 320 is substantially similar to the turbine wheel assembly 20 shown in FIGS. 1-7 and described herein. Accordingly, similar reference numbers in the 300 series indicate features that are common between the turbine wheel assembly 20 and the turbine wheel assembly 320. The description of the turbine wheel assembly 20 is incorporated by reference to apply to the turbine wheel assembly 320, except in instances when it conflicts with the specific description and the drawings of the turbine wheel assembly 320.

The turbine wheel assembly 320 includes a disk assembly 324, a forward annular coverplate 326, an aft annular coverplate 328, and anti-rotation features 330 as shown in FIG. 12. The disk assembly 324 includes a disk 334 and a plurality of turbine blades 336 as shown in FIG. 12. The disk 334 includes a body 340 which defines a plurality of blade-receiver slots 332, a castellated band 342, and a castellated band 343 as shown in FIG. 12. The castellated bands 342, 343 re coupled with the body 340 to define circumferentially extending disk channels 344 between the body 340 and the castellated bands 342, 343.

The castellated band 342 includes a disk rail 346 and a plurality of disk tabs 348 as shown in FIG. 12. The disk rail 346 extends axially away from the body 340. The plurality of disk tabs 348 extend radially away from the disk rail 346. Each of the plurality of disk tabs 348 is spaced apart from one another circumferentially around the axis 11 to form openings 350 between the disk tabs 348. In the illustrative embodiment, at least one of the plurality of disk tabs 348 is formed to define a pin-receiving passage 352 defined by a notch 353 as shown in FIG. 12.

Each of the plurality of blades 336 includes a root 356, an airfoil 358, and a platform 360 as shown in FIG. 12. In some embodiments, the platform 360 may be an offloaded platform. In other embodiments, the forward annular coverplate 326 may be shaped to include a forward platform wing and the aft annular coverplate 328 may be shaped to include an aft platform wing.

The forward annular coverplate 326 includes a forward retainer wall 362 and a forward castellated ring 364 as shown in FIG. 12. The retainer wall 362 extends radially outward away from the axis 11. The castellated ring 364 is located in the disk channel 344 to cause the castellated ring 364 to be interlocked with the castellated band 342 of the disk 334.

The forward retainer wall 362 includes forward retainer panel 366, a forward upper support arm 368, and a forward retainer ring slot 370 as shown in FIG. 12. The retainer panel 366 is arranged circumferentially around the axis 11. The upper support arm 368 extends axially from the retainer panel 366 to define a coverplate channel 372 that opens axially inwardly. The retainer ring slot 370 is configured to receive a portion of a retainer ring 3104 included in the anti-rotation features 330 to block axially outward movement of pins 3100 away from the disk assembly 324. The castellated ring 364 of the forward annular coverplate 326 includes a coverplate rail 374 and a plurality of coverplate tabs 376 as shown in FIG. 12. The coverplate rail 374 extends axially away from the retainer wall 362. Each of the plurality of coverplate tabs 376 are spaced apart from one another circumferentially around the axis 11 to form openings 378 between the coverplate tabs 376.

The aft annular coverplate 328 includes an aft retainer wall 380 and an aft castellated ring 382 as shown in FIG. 12. The retainer wall 380 extends radially outward away from the axis 11. The castellated ring 382 is located in the disk channel 344 to cause the castellated ring 382 to be interlocked with the castellated band 342 of the disk 334. The aft retainer wall 380 includes aft retainer panel 384, an aft upper support arm 386, and an aft retainer ring slot 388 as shown in FIG. 12. The retainer panel 384 is arranged circumferentially around the axis 11. The upper support arm 386 extends axially from the retainer panel 384 to define a coverplate channel 390 that opens axially inwardly. The retainer ring slot 388 is configured to receive a portion of a retainer ring 31004.

The castellated ring 382 of the aft annular coverplate 328 includes a coverplate rail 394 and a plurality of coverplate tabs 396 as shown in FIG. 12. The coverplate rail 394 extends axially away from the retainer wall 380. The plurality of coverplate tabs 396 extend radially away from the coverplate rail 394. Each of the plurality of coverplate tabs 396 are spaced apart from one another circumferentially around the axis 11 form openings 398 between the coverplate tabs 396.

In some embodiments, the openings 350 formed in the castellated band 342 between the disk tabs 348 may be sized to allow at least one of the coverplate tabs 376, 396 to pass through the opening 350. In the illustrative embodiment, the openings 350 are sized to allow more than one coverplate tab 376, 396 to pass through the opening 350.

The anti-rotation features 330 include pins 3100 and retainer rings 3104 as shown in FIG. 12. Each pin 3100 is located circumferentially between a pair of the plurality of coverplate tabs 376, 396. The pin 3100 extends axially through one of the plurality of disk tabs 348, into the disk channel 344, and at least a portion of the pin 3100 is located in the one of the coverplate tabs 376, 396 of the castellated ring 364, 382 of the annular coverplate 326, 328. In the illustrative embodiment, the pin 3100 extends axially through the notch 354 forming the pin-receiving passage 352 in one of the disk tabs 348 into the disk channel 344. The retainer ring 3104 is received in the annular coverplate 326, 328 in the retainer ring slot 370, 388. The retainer ring 3104 is spaced apart axially from the plurality of coverplate tabs 376, 396 to locate the plurality of disk tabs 348 therebetween. The retainer ring 3104 may include spring, spiral, snap, or spirolox rings and clips.

A method of assembling the turbine wheel assembly 320 may include a number of steps. The method includes providing the wheel assembly 320 that includes the disk 334, the plurality of blades 336, at least one of the annular coverplates 326, 328, and the anti-rotation feature 330. The method includes inserting the plurality of blades 336 in the disk 334 so that the plurality of blades 336 are arranged circumferentially around the axis 11 of rotation of the disk 334, The method includes aligning the annular coverplate 326, 328 axially along the axis 11 and moving the annular coverplate 326, 328 axially relative to the disk 334 to receive a portion of the annular coverplate 326, 328 in channel 344 defined by the disk 334. The method includes rotating the annular coverplate 326, 328 relative to the disk 334 to interlock the annular coverplate 326, 328 with the disk 334 to cause the annular coverplate 326, 328 to block axial movement of the plurality of blades 336 relative to the disk 334. The method also includes inserting an anti-rotation pin 3100 axially through the disk 334 into an opening 352 formed in the annular coverplate 326, 328. The method further includes inserting the retainer ring 3104 in the annular coverplate 326, 328 to block axial movement of the anti-rotation pin 3100 away from the disk 334.

The present disclosure related to coverplates, both forward and aft, which are common features on turbine wheels. The coverplates serve to limit axial travel of blades, to seal the cavity under the blade platform or under the attachment, and to allow cooling air to enter the aforementioned cavities. The coverplates may also be used to enable the use of ceramic matrix composite blades by using the coverplates to position, support, and retain off-loaded blade platforms. In some embodiments, an anti-rotation feature may be needed in the coverplates to keep components positioned correctly. The anti-rotation feature for a coverplate may be used on the forward side of the disk, aft side of the disk, or both.

In some embodiments, a coverplate 26, 28 is fitted onto a turbine disk and then is constrained by a retention pin, bolt, or bolts 100, 2100, 3100 as shown in FIGS. 2-12. For the embodiment of FIGS. 2-7, the turbine disk has a hook feature, below the blade attachment, with a series of slots 50. The design also includes a coverplate 26, 28. The coverplate has a series of tabs 76, 96 that are sized to fit into a slot 50. The tabs 76, 96 include a threaded hole 50 for insertion of the retention bolt 100. The coverplate 26, 28 is installed on to the disk 34, making sure that one of the tabs 76, 96 is inserted into the slot 50. The coverplate 26, 28 is then rotated until the hole 52 for the retention bolt 100 lines up with the anti-rotation slot 54. Once aligned, the retention bolt 100 may be inserted and tightened down. Once installed, the retention bolt 100 will keep the coverplate 26, 28 from being able to rotate. The tabs 76, 96 also act as a bayonet fitting and will retain the coverplate 26, 28 axially.

In the embodiment of FIGS. 8-11, the tab 276, 296 is interrupted in the middle of the tab 276, 296 for the insertion of an anti-rotation key 2102. This embodiment assembles similarly to the embodiment of FIGS. 2-7 with the key 2102 being bolted or affixed to the disk 234 as opposed to the coverplate 226, 228 being directly affixed to the disk 234. The potential advantage to this embodiment relates to thermal growth. If the coverplate 226, 228 grows at a slightly different rate than the disk 234, the use of the anti-rotation key 2102 may not lock the coverplate 226, 228 to the disk 234 and allow for an additional degree of freedom that could help minimize stresses.

In other embodiments, the anti-rotation keys 2102 may be made different weights by way of thickness, size, or material density. The keys 2102 could then be used as balance weights for the disk 234 by placing heavier or lighter weights where needed. In other embodiments, the balance weights may be attached to the wheel under the retention bolts 2100. A variety of weights could be fabricated and the placed as required to balance the disk 234. Variable weights could be achieved through varying the size, thickness, or density of the balance weight. Configuration and positioning of the weight may be optimized based on the wheel and coverplate design.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A wheel assembly for a gas turbine engine, the wheel assembly comprising
 a disk adapted to rotate about an axis during use of the gas turbine engine, the disk including a body formed to define a plurality of blade-receiver slots that extend axially through the body and a castellated band coupled with the body to define a circumferentially extending disk channel between the body and the castellated band, an annular coverplate coupled with the disk to at least partially block axial access into the plurality of blade-receiver slots, the annular coverplate including a retainer wall and a castellated ring that extends away from the retainer wall, and the castellated ring located in the disk channel to cause the castellated ring to be interlocked with the castellated band of the disk, and an anti-rotation feature configured to limit rotation of the annular coverplate about the axis relative to the disk, the anti-rotation feature extends axially through the castellated band and into the disk channel such that a portion of the anti-rotation feature is aligned axially with and configured to engage circumferentially a portion of the castellated ring, wherein the castellated ring of the annular coverplate includes a coverplate rail that extends axially away from the retainer wall and a plurality of coverplate tabs that extend radially away from the coverplate rail, each of the plurality of coverplate tabs are spaced apart from one another circumferentially around the axis, the castellated band includes a disk rail that extends axially away from the body and a plurality of disk tabs that extend radially away from the disk rail, and each of the plurality of disk tabs are spaced apart from one another circumferentially around the axis, and wherein the anti-rotation feature includes a retainer ring received in the annular coverplate and the retainer ring is spaced apart axially from the plurality of coverplate tabs to locate the plurality of disk tabs therebetween.

2. The wheel assembly of claim 1, wherein the anti-rotation feature further includes a pin that extends axially through one of the plurality of disk tabs and into the disk channel.

3. The wheel assembly of claim 2, wherein the pin extends axially through one of the plurality of coverplate tabs.

4. The wheel assembly of claim 2, wherein the pin is located circumferentially between a pair of the plurality of coverplate tabs.

5. The wheel assembly of claim 1, wherein the anti-rotation feature further includes a pin that extends axially through the castellated band and into the disk channel.

6. A wheel assembly for a gas turbine engine, the wheel assembly comprising a disk that includes a body arranged around an axis and a castellated band coupled with the body to define a circumferentially extending disk channel between the body and the castellated band, an annular coverplate that includes a retainer wall and a castellated ring coupled with the retainer wall and located in the disk channel, and an anti-rotation feature that extends axially through the castellated band of the disk and into the disk channel, wherein the castellated band includes a disk rail that extends axially away from the body of the disk and a plurality of disk tabs that extend radially outward away from the disk rail, each of the plurality of disk tabs are spaced apart from one another circumferentially around the axis, at least one of the plurality of disk tabs is formed to define a pin-receiving passage that extends axially through the at least one of the plurality of disk tabs, and the anti-rotation feature includes a pin that extends axially through the pin-receiving passage, and wherein the castellated ring includes a coverplate rail that extends axially away from the retainer wall and a plurality of coverplate tabs that extend radially inward away from the coverplate rail and the anti-rotation feature includes a key block located circumferentially between a neighboring pair of coverplate tabs included in the plurality of coverplate tabs and the pin that extends axially through the castellated band and into the key block.

7. The wheel assembly of claim 6, wherein the at least one of the plurality of disk tabs is formed to include a notch that extends radially inward into the at least one of the plurality of disk tabs to form the pin-receiving passage.

8. The wheel assembly of claim 6, wherein the passage is threaded.

9. A method comprising providing a wheel assembly that includes a disk, a plurality of blades, and an annular coverplate, inserting the plurality of blades in the disk so that the plurality of blades are arranged circumferentially around an axis, aligning the annular coverplate axially along the axis, moving the annular coverplate axially relative to the disk to receive a portion of the annular coverplate in channel defined by the disk, rotating the annular coverplate relative to the disk to interlock the annular coverplate with the disk to cause the annular coverplate to block axial movement of the plurality of blades relative to the disk, inserting an anti-rotation pin axially through the disk into an opening formed in the annular coverplate, and inserting a retainer ring in the annular coverplate to block axial movement of the anti-rotation pin away from the disk.

\* \* \* \* \*